(12) United States Patent
Leyva, Jr. et al.

(10) Patent No.: US 8,826,517 B2
(45) Date of Patent: Sep. 9, 2014

(54) FIBER HANDLER HAVING MULTIPLE SIDES

(75) Inventors: Daniel Leyva, Jr., Arlington, TX (US);
 David W. Meek, Ft. Worth, TX (US);
 Ashley W. Jones, Denton, TX (US);
 Kevin C. Beach, Haltom City, TX (US)

(73) Assignee: Corning Cable Systems LLC, Hickory, NC (US)

( * ) Notice: Subject to any disclaimer, the term of this patent is extended or adjusted under 35 U.S.C. 154(b) by 564 days.

(21) Appl. No.: 12/756,663

(22) Filed: Apr. 8, 2010

(65) Prior Publication Data

US 2011/0247200 A1    Oct. 13, 2011

(51) Int. Cl.
 *B21D 39/00* (2006.01)
 *G02B 6/36* (2006.01)
 *G02B 6/255* (2006.01)

(52) U.S. Cl.
 CPC ............ *G02B 6/3616* (2013.01); *G02B 6/2553* (2013.01); *G02B 6/3652* (2013.01)
 USPC ................... 29/700; 29/729; 29/747; 29/750; 385/56; 385/87

(58) Field of Classification Search
 CPC .... G02B 6/3897; G02B 6/389; G02B 6/3825; G02B 6/3849; H01R 43/20–43/22; H01R 43/28; H01R 43/205; H01B 13/18; H02G 1/02
 USPC ................... 29/729, 739, 828, 745–748, 700; 385/96–97, 134, 56, 59, 63, 72–77, 385/137–139; 156/158, 293; 30/92, 278; 81/9.4, 9.41, 9.51
 See application file for complete search history.

(56) References Cited

U.S. PATENT DOCUMENTS

| | | | | |
|---|---|---|---|---|
| 4,043,854 | A | 8/1977 | Le Noane et al. | 156/158 |
| 4,227,951 | A * | 10/1980 | Mignien | 156/158 |
| 4,537,466 | A | 8/1985 | Moisson et al. | 350/96.2 |
| 4,727,237 | A | 2/1988 | Schantz | 219/121 LC |
| 5,108,021 | A * | 4/1992 | Vines | 225/2 |
| 5,717,813 | A * | 2/1998 | Harman et al. | 385/147 |
| 5,740,301 | A * | 4/1998 | Harman et al. | 385/147 |
| 6,061,492 | A | 5/2000 | Strause et al. | 385/135 |
| 6,099,684 | A * | 8/2000 | Dannoux | 156/293 |
| 6,327,414 | B1 | 12/2001 | Strause et al. | 385/135 |
| 6,425,693 | B2 * | 7/2002 | Schmatz | 385/59 |
| 6,496,641 | B1 | 12/2002 | Mahony | 385/135 |
| 6,516,131 | B1 * | 2/2003 | Tullis | 385/137 |
| 6,542,652 | B1 | 4/2003 | Mahony | 385/15 |
| 6,612,754 | B2 | 9/2003 | Dahmani et al. | 385/96 |
| 6,625,375 | B1 | 9/2003 | Mahony | 385/135 |
| 7,144,165 | B2 | 12/2006 | Huang et al. | 385/96 |
| 7,438,485 | B2 | 10/2008 | Tabata et al. | 385/97 |
| 8,032,001 | B2 * | 10/2011 | Mullaney et al. | 385/135 |
| 8,161,628 | B2 * | 4/2012 | Lin | 29/700 |

(Continued)

*Primary Examiner* — Minh Trinh

(57) ABSTRACT

A fiber handler for handling a plurality of different fiber optic cable constructions is disclosed. Generally, the fiber handler comprises a first face that accepts a fiber optic cable of a first construction and a second face that accepts a fiber optic cable of a second construction. An alternate embodiment is disclosed that can accommodate up to four different fiber optic cable constructions. The fiber handler may interface with a fiber optic installation tool such as a fiber cleaving tool or a fiber splicing tool where it functions to align an optical fiber of the cable with functional components of the tool to be cleaved, fused, or the like.

16 Claims, 3 Drawing Sheets

(56) References Cited

U.S. PATENT DOCUMENTS 8,459,877 B2 * 6/2013 Barnes et al. .................. 385/56
2004/0213526 A1 * 10/2004 Inoue et al. .................... 385/96
2005/0163447 A1 * 7/2005 Takahashi et al. ............ 385/134
2005/0276549 A1 * 12/2005 Tabata et al. ................... 385/96

* cited by examiner

FIBER HANDLER HAVING MULTIPLE SIDES

BACKGROUND

The present disclosure generally relates to fiber optic cables and more specifically to installation tools for cleaving, splicing, or otherwise treating optical fibers during an installation.

This disclosure is made primarily within the context of an optical fiber cleaving tool that cuts or cleaves an optical fiber cleanly for installation of a connector or the like. It will be understood, however, that the invention is not limited to a cleaving tool, but may be applicable to other types of optical fiber installation tools such as for instance, fiber splicing tools.

In order to cut or cleave an optical fiber properly for installing connectors and the like, the optical fiber must be precisely positioned relative to a set of critical components within a fiber cleaving tool. The critical components may include, for example, fiber alignment elements, fiber gripping or clamping surfaces, a scoring blade, and a cleaving anvil. Many fiber cleaving tools include a fiber handler upstream of these critical components that accepts and holds the jacket from which a stripped optical fiber extends and aligns the optical fiber to the critical components within the cleaving tool. Fiber handlers known in the art are designed to accept and align a single fiber cable construction, which may include, for example, a 250 μm coated fiber, a furcated fiber, a tight buffered fiber, and a multitude of jacketed cable types and sizes. As a result of these different fiber/cable constructions, each of which requires a different fiber handler, a fiber cleaving toolkit can potentially require four or more separate fiber handlers to cleave multiple fiber constructions. Having multiple fiber handlers can add to product cost, increase confusion and potential error by the user of a cleaving tool, and increase the complexity of a toolkit.

SUMMARY

In accordance with one aspect of the present disclosure, a fiber handler for a fiber optic installation tool, such as a cleaving tool, has a configuration that facilitates the handling, holding, and alignment of a fiber optic cable from the end of which a stripped optical fiber projects. Generally, the fiber handler comprises a body having opposed ends, a first face, and a second face. The fiber handler is not limited to two faces and may have as many faces as required depending on a particular application or a particular configuration. The body is configured to be selectively mounted to the fiber installation tool with its first face in an operable position or with its second face in an operable position with respect to the installation tool. The first face is configured to accept a fiber optic cable or jacketed optical fiber of a first construction and to align a stripped fiber projecting from its end to the installation tool for being cleaved when the first face is in its operable position. The second face is configured to accept a fiber optic cable or a jacketed optical fiber of a second construction and to align a stripped fiber projecting from its end to the installation tool when the second face is in its operable position.

According to another aspect of the present disclosure, a fiber handler in combination with a fiber optic installation tool is disclosed. The fiber optic installation tool generally comprises a mechanism for performing a predetermined operation on an optical fiber, such as splicing or cleaving. The fiber optic installation tool has a bay for receiving the fiber handler, which is configured to accept a fiber optic cable and to align the stripped optical fiber thereof to the mechanism of the fiber optic installation tool. The fiber handler may be removably mounted in the bay with the fiber handler having a first face configured to accept an optical fiber of a first construction and a second face configured to accept an optical fiber of a second construction. The fiber handler may be oriented in the bay to locate the first face in an operable position for accepting an optical fiber of the first construction and aligning the optical fiber with the mechanism. The fiber handler may be selectively re-mountable in the bay to position the second face in an operable position for accepting an optical fiber of the second construction and aligning the optical fiber with the mechanism.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

The present disclosure is directed to a fiber handler for use in conjunction with a fiber optic installation tool. In another aspect of the present disclosure is the use of a fiber handler to manage, support, and align a plurality of fiber optic cable constructions. Although disclosed primarily within the context of a fiber handler for use with a fiber cleaving tool, the skilled artisan will recognize that the principles of the present disclosure are not limited to a fiber handler for use with a fiber cleaving tool but extend to any type of tool wherein optical fibers require alignment before being treated in some way.

Figures 1A, 1B:
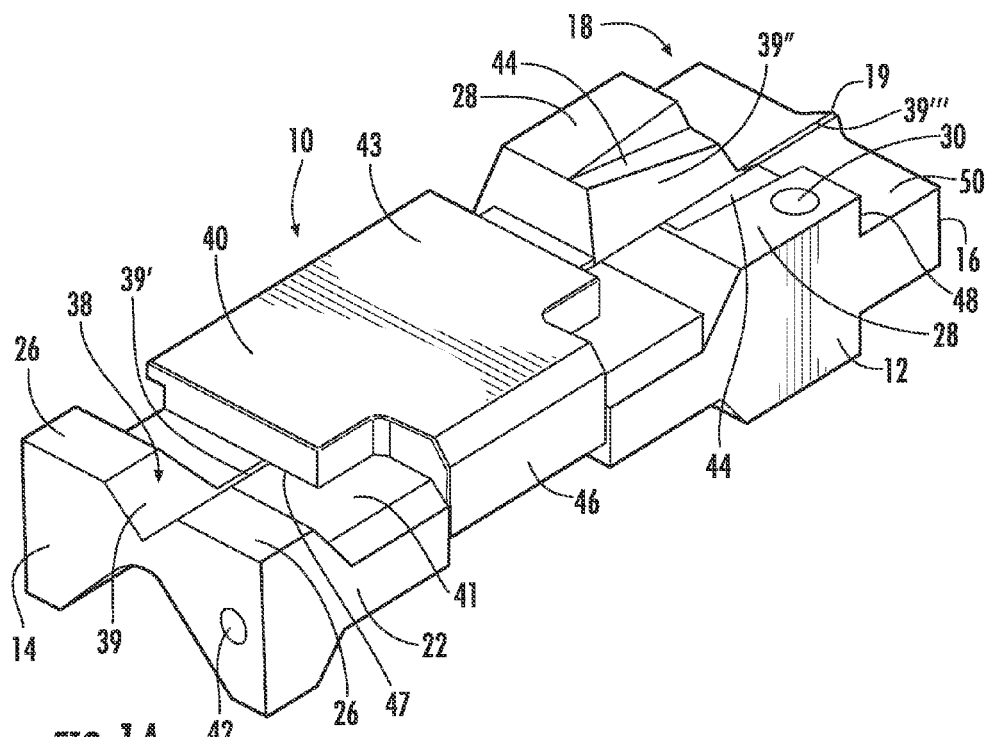
FIG. 1A is an isometric view showing a first face of a fiber handler according to a first embodiment of this disclosure.
FIG. 1B is an isometric view showing a second face of the fiber handler according to FIG. 1A and according to the first embodiment of this disclosure.

FIGS. 1A and 1B are isometric views showing a first face 18 and a second face 20 of a fiber handler 10 according to a first embodiment of this disclosure. The fiber handler 10 is advantageous since it allows accommodation of a variety of different fiber optic cables types and/or constructions to interface with a variety of different fiber installation tools. For example, the fiber handler 10 may accommodate a 250 micrometer (μm) diameter coated fiber construction, a furcated fiber construction, a tight buffered fiber construction (typically 900 μm diameter) and a multitude of jacketed optical cable types and sizes. Further, the fiber handler 10 may interface with a variety of fiber installation tools including a fiber cleaving tool, a fusion splicing tool, or other similar installation tools that may be used for fiber preparation.

The fiber handler 10 has a body 12 that extends between a first end 14 and a second end 16 and between a first side 22 and a second side 24. The width of the fiber handler 10, i.e. the distance between the first side 22 and the second side 24, and the length of the fiber handler 10, i.e. the distance between the first end 14 and the second end 16, are determined based on the interface or mounting requirements of a fiber installation tool in which the fiber handler is to be mounted, as well as the size of the fiber installation tool.

Figure 3A:
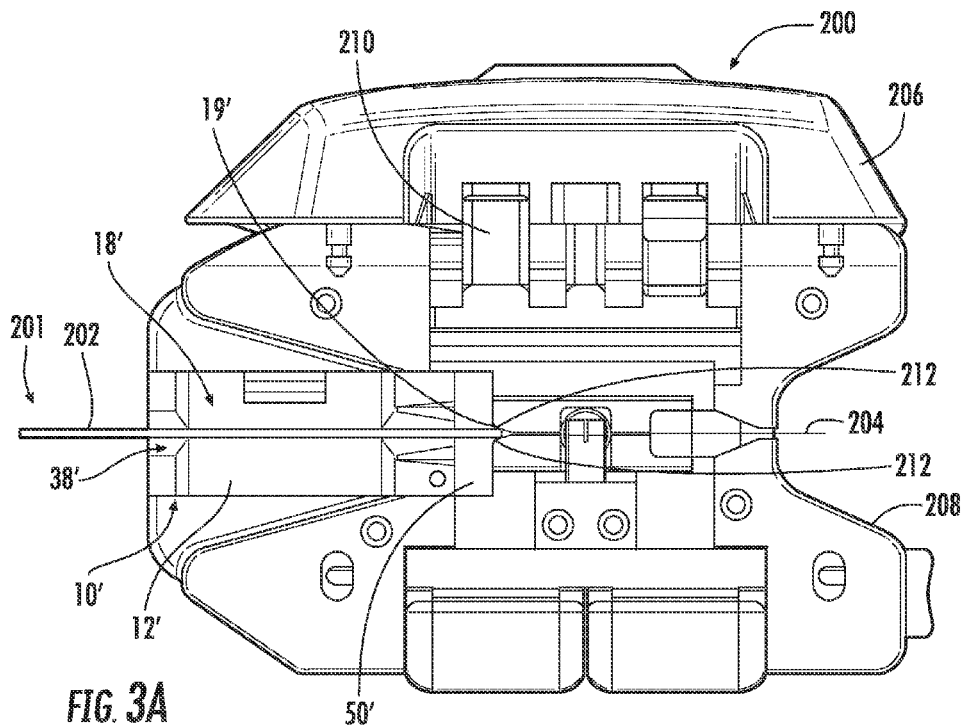
FIG. 3A is plan view of the fiber handler illustrated in an installed configuration mounted in a fiber optic installation tool.
Figure 3B:
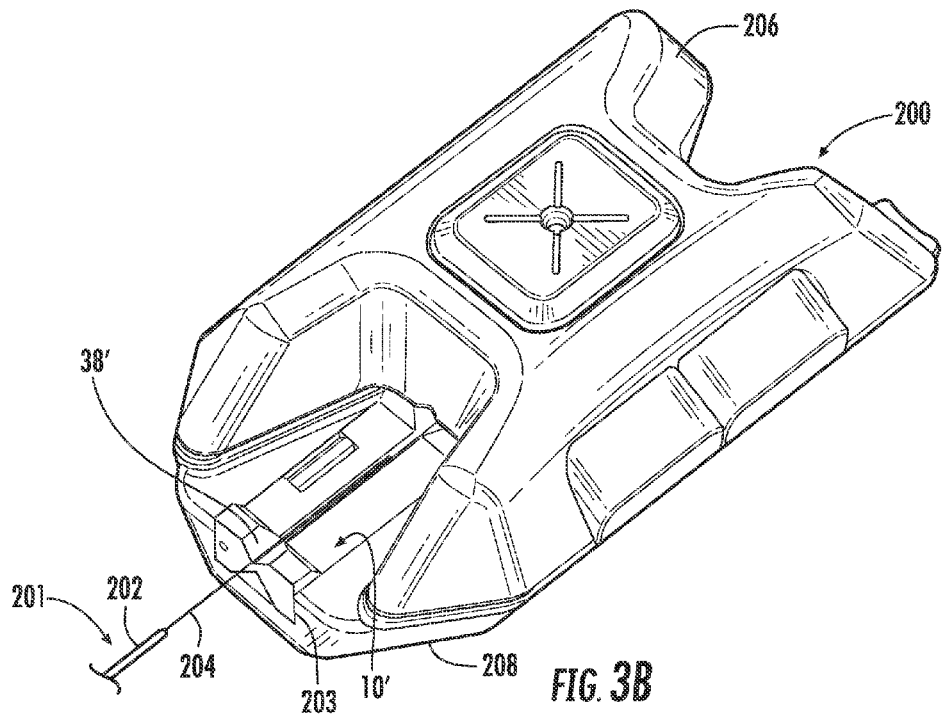
FIG. 3B is an isometric view showing the fiber handler of FIG. 3A and installed in the fiber optic installation tool of FIG. 3A.

The fiber handler 10 is illustrated as having two faces 18, 20 that extend between the two ends 14, 16 and are substantially flat. The first face 18 and the second face 20 each contain a plurality of substantially flat contact surfaces or facets 26, 28 and 32, 34, respectively, that are arranged at various locations between the two ends 14, 16. Contact surfaces 26, 28, 32, 34 interface with corresponding surfaces (not visible) of the fiber installation tool (FIGS. 3A and 3B). In one embodiment, one or more magnets 30, 36 may be arranged on any of the contact surfaces 26, 28, 32, 34 of fiber handler 10 for interfacing with the fiber installation tool. The one or more magnets 30, 36 function to mount the fiber handler 10 removably in place while the fiber handler 10 is in contact with the fiber installation tool, or any other surface that the fiber handler 10 may be removably mounted thereto. A protrusion 19, 21 is located proximate the second end 16 of the fiber handler 10 and may interface with the fiber installation tool and aid in aligning the fiber handler 10 with the fiber installation tool. Additionally, the protrusion 19, 21 may further support and/or guide an optical fiber during any one of a number of cable installation operations.

The first face 18 and the second face 20 may be sized and configured to receive fiber optic cables of differing sizes and constructions. With reference to the first face 18, a first "V" shaped channel 38 is arranged in the first face 18 and may extend from the first end 14 to the second end 16. The first channel 38 is comprised of several consecutively arranged channel portions. A first channel portion 39 is arranged adjacent the first end 14 with a second channel portion 39', a third channel portion 39", and a fourth channel portion 39''' arranged adjacent the second end 16. The channel portions 39, 39', 39", 39''' are arranged consecutively and extend from the first end 14 to the second end 16.

The first channel 38 is illustrated as generally "V" shaped in cross section and each of the channel portions 39, 39', 39", 39''' are illustrated as generally "V" shaped in cross section as well. The channel 38 is sized to accommodate a particular fiber optic cable size and construction and each of the channel portions 39, 39', 39", 39''' may be able to accommodate the particular fiber optic cable as well. Although the first channel 38 is illustrated as being generally "V" shaped in cross section, the first channel 38 may be a channel having any suitable cross-section. For example, the first channel cross section may be arcuate, rectangular, polygonal, a notch, or combinations thereof.

The first channel 38 may receive a coated fiber and/or the jacket of a fiber optic cable and functions as a guide and support for management of the fiber optic cable and to facilitate alignment of the fiber optic cable and particularly its internal optical fiber with the fiber installation tool. Typically, the fiber optic cable received in the first channel 38 is a fiber optic cable of a first construction. Non-limiting examples of cable/fiber constructions are buffered fiber optic cables or a jacketed optical fiber. The size of the first channel 38 is such that an outer diameter of the fiber optic cable may comfortably reside within the first channel 38 and any of the channel portions 39, 39', 39", 39'''.

While the fiber optic cable is positioned within the first channel 38, a fiber restraint may be used to retain the fiber optic cable in place. Although the fiber restraint illustrated in this embodiment is a latch 40 for holding a fiber optic cable in place, any suitable means of retaining the fiber optic cable within the first channel 38 may be used as the fiber restraint. The latch 40 has a generally flat upper surface 43 and a generally flat lower surface 47 and is hingedly connected to the body 12 by a hinge pin 42 that extends through a portion of the body 12 and a portion 46 of the latch 40. By way of example, the fiber restraint may be a clamp, an adhesive wrap, a plate magnetically affixed to the body 12, or any suitable means of retaining the fiber optic cable in the channel may be used. Likewise, fiber restraints can have other suitable structures such as a living hinge, snap-together hinges or the like to permit movement of the fiber restraint. The latch 40 may pivot between an open position and a closed position (illustrated). Furthermore, the latch 40 may pivot between an open position and a closed position with respect to each of the first face 18 and the second face 20. In the closed position with respect to the first face 18, the latch 40 may contact a substantially flat surface 41 of the first face 18. Facets 44 on the first face 18 are regions where excess material has been removed from the body 12 so the fiber handler 10 may interface with the fiber installation tool.

As shown, the first face 18 includes a step 48 from contact surface 28 to cable support surface 50. The step 48 may provide a clearance for components of the fiber installation tool. For example, if the fiber handler 10 is installed in a fiber cleaving tool, the fiber cleaving tool may generally comprise a cable clamping device that may rest on cable support surface 50 and secure the cable in place while cleaving. However, in other variations a step may not be necessary.

The second face 20 comprises a second "V" shaped channel 52, which may be different in size and shape from the first "V" shaped channel 38. The second channel 52 is arranged in the second face 20 and may extend from the first end 14 to the second end 16. The second channel 52 may comprise a first channel portion 53 and a second channel portion 53'. The first channel portion 53 is substantially "V" shaped and may have a round 56 of a given radius at a base of the first channel portion 53. The first channel portion 53 extends from the first end 14 to a transition location 55 between the first end 14 and the second end 16. Typically, a fiber optic cable of a second construction, which may be larger or smaller in diameter than the fiber optic cable of the first construction and may comprise an outer jacket, is supported in the second channel 52 of the second face 20.

The first region 53 is sized and configured to receive the outer jacket of the fiber optic cable with the round 56 being about the same radius as that of the outer jacket. Of course, the channel and/or regions thereof can have any suitable size and/or shape for the desired optical fiber or fiber optic cable. The second channel portion 53' extends from the transition location 55 to the second end 16 of the fiber handler 10. The second channel portion 53' has a substantially "V" shaped cross section 62 and may differ in cross section from the first channel portion 53. In this embodiment, the transition location 55 is a step 58 that extends from a base 60 of the first channel portion 53 to a base 64 of the second channel portion 53'. The second channel 52 is illustrated as being generally "V" shaped in cross-section, however a channel having any cross section may be used. For example, the second channel cross section may be arcuate, rectangular, polygonal, or combinations thereof. Furthermore, the first channel portion 53 and the second channel portion 53' need not be similar in cross-sectional size and/or cross-sectional shape.

Further, the latch 40 may pivot about the hinge pin 42 so the flat upper surface 43 may contact a substantially flat surface 66 of the second face 20. In a closed position, the latch 40 may hold the outer jacket of the fiber optic cable in a secure position while the fiber optic cable is being manipulated or managed.

Typically, when a jacketed fiber optic cable is installed in the handler 10, a predetermined length of the outer jacket (e.g. which may include a buffer and/or a coating) is stripped from an end of the cable to expose the optical fiber therein. This forms a transition in the jacketed fiber optic cable from the outer jacket to an inner buffered optical fiber and the bare fiber projects from the end of the stripped jacket. The jacket of the fiber optic cable is placed in the fiber handler 10 and advanced toward the transition location 55 until the outer jacket contacts and is arrested by a step 58 proximate the transition location 55. The step 58 between the first channel portion 53 and the second channel portion 53' may function to arrest the outer jacket of the cable and prevent the outer jacket from entering the second channel portion 53' of the second channel 52. Thus, the buffered optical fiber projects from the end of the arrested jacket to reside in the second channel portion 53' and extend beyond the second end 16 of the fiber handler 10 into functional regions of the installation tool. The jacketed fiber optic cable will reside in the first channel portion 53 of the second channel 52. The latch 40 may be pivoted into the closed position, i.e. upper flat surface 43 in contact with the substantially flat surface 66 of the second face 20, to hold the cable in place. As illustrated, the second face 20 includes a step 49 from contact surface 34 to cable support surface 51. The step 49 may provide a clearance for components of the fiber installation tool. For example, if the fiber handler 10 is installed in a fiber cleaving tool, the fiber cleaving tool generally will comprise a cable clamping device that may rest on cable support surface 51 to secure the cable in place while cleaving.

Figure 2A:
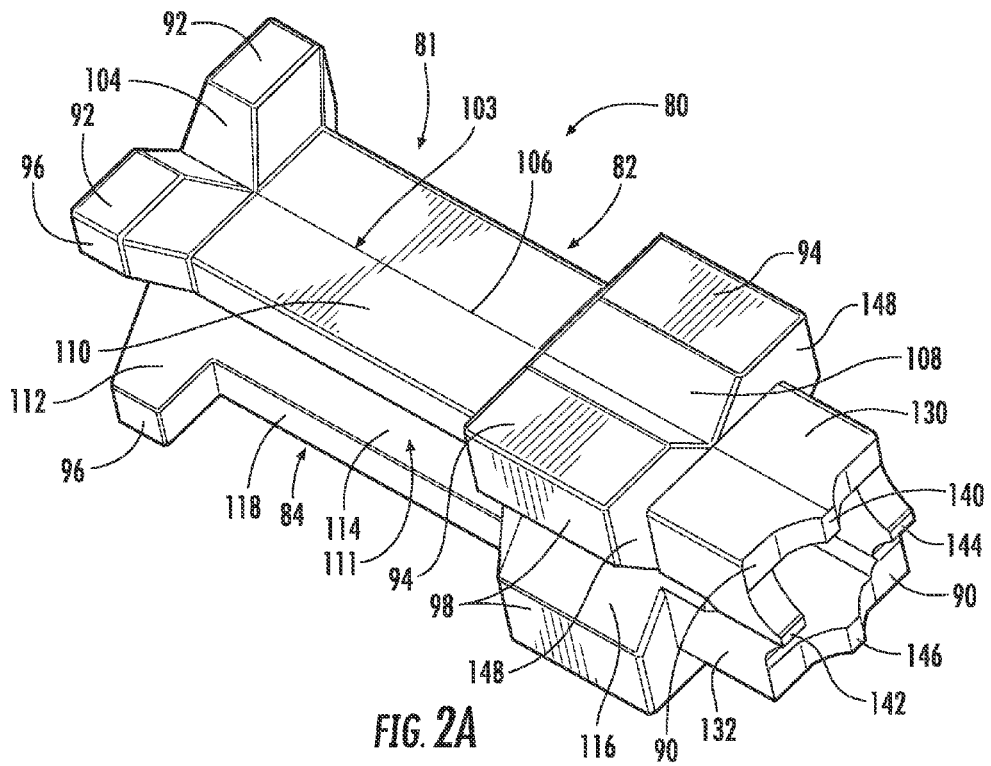
FIG. 2A is an isometric view showing a first face of a fiber handler according to a second embodiment of this disclosure.
Figure 2B:
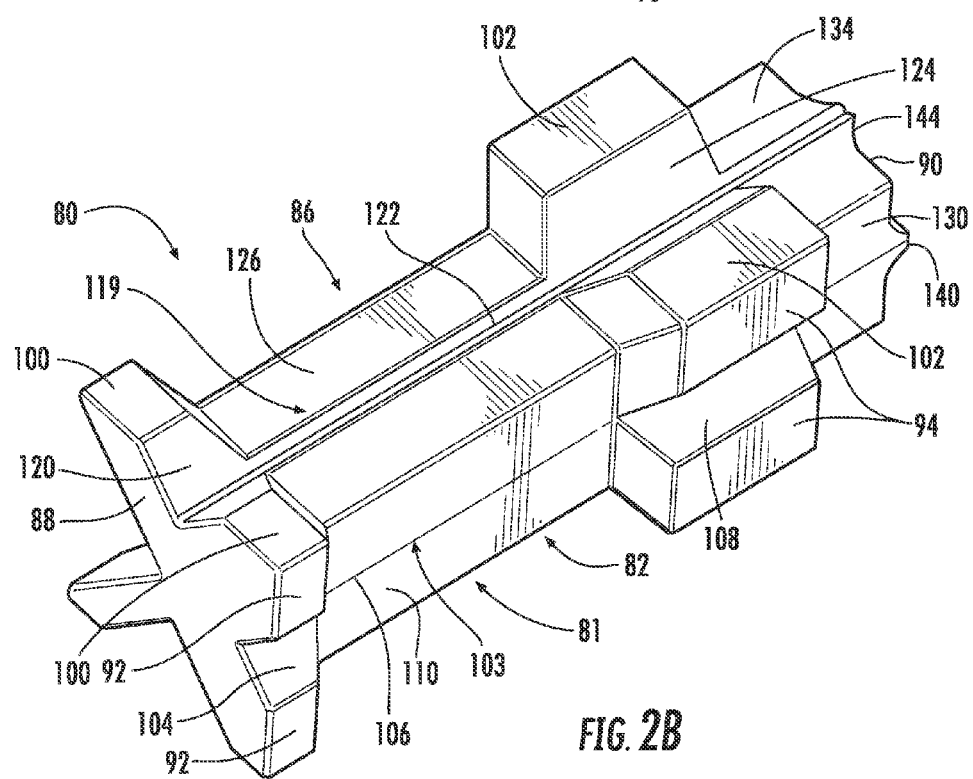
FIG. 2B is an isometric view showing a second face of the fiber handler of FIG. 2A and according to the second embodiment of this disclosure.

FIGS. 2A and 2B are isometric views showing a fiber handler 80 having a plurality of faces configured for accepting optical fibers and/or optical fiber cables of different constructions. Specifically, fiber handler 80 includes a first face 82, a second face 84, and a third face 86, and a fourth face (not visible) according to a second embodiment of this disclosure. The fiber handler 80 generally has a body 81 extending between a first end 88 and a second end 90. The fiber handler 80 is not limited to four receiving surfaces and may have as many faces as are required, or as many faces as the fiber handler 80 can accommodate. Generally speaking, the fiber handler can have a generally polygonal cross-section that provides the desired number of sides for cooperating with an installation tool such as a pentagon, hexagon, etc. The fiber handler 80 may interface with a fiber installation tool, such as a fiber cleaving tool or a fiber splicing tool, or may be used to secure and manage a fiber optic cable. Each face 82, 84, 86 and the non-visible face has a plurality of contact surfaces 92, 94, 96, 98, 100, 102, respectively, that interface with the fiber installation tool and provide support and alignment between the fiber handler 80 and the fiber installation tool.

The construction of the faces 82, 84, 86 may be generally the same as the faces discussed throughout this document, and in particular in connection with the first embodiment. Each face 82, 84, 86 has a channel 103, 111, 119 extending from the first end 88 to the second end 90 that may be substantially linear. The channels 103, 111, 119 may be and suitable size and/or shape and may have differing sizes to accommodate different fiber optic cable constructions and/or sizes. Each channel 103, 111, 119 may a first channel portion 104, 112, 120, a second channel portion 106, 114, 122, and may have a third channel portion 108, 116, 124, wherein the second channel portion 106, 114, 122 is arranged between the first channel portion 104, 112, 120 and the third channel portion 108, 116, 124. Each first channel portion 104, 112, 120 is arranged proximate the first end 88 and each third channel portion 108, 116, 124 is arranged proximate the second end 90. Between each of the first channel portions 104, 112, 120 and each of the third channel portions 108, 116, 124 is a substantially flat surface 110, 118, 126 and the second channel portion 106, 114, 122 may be arranged in the substantially flat surface 110, 118, 126. Channels 103, 111, 119 are understood to extend from a channel base to respective contact surfaces 92, 94, 96, 98, 100, 102 and respective substantially flat surfaces 110, 118, 126. Channels 103, 111, 119 function to guide, support, restrain, and/or align the fiber optic cable and/or optical fiber.

With regards to the face identified as face 82, a step 148 is arranged proximate the second end 90 and is located between contact surface 94 and a cable support surface 130. The step may provide necessary clearance for components of a fiber installation tool to contact the cable support surface 130 and secure the cable in position. Although discussed in connection with face 82, each face 82, 84, 86, and the non-visible face may include such a step; however, other variations may not employ a step.

Each face 82, 84, 86 of the fiber handler 80 may further include a cable support surface 130, 132, 134 to support and guide the cable while performing a cable operation. Each cable support surface 130, 132, 134 is a substantially flat surface and may include a portion of the channel 103, 111, 119. The cable support surface 130, 132, 134 has an end adjacent the second end 90 of the fiber handler 80. Extending from the end of each cable support surface 130, 132, 134 is a protrusion 140, 142, 144. A protrusion 146 extends from a cable support surface of the fourth face, which is not visible. The protrusions 140, 142, 144, 146 may include a round or a chamfer that transitions from an end of the protrusion to the end of each cable support surface. The protrusion may engage with a corresponding surface of the fiber installation tool (see FIG. 3A) and may ensure that the fiber handler 80 is properly aligned with the fiber installation tool. The protrusion 140, 142, 144, 146 also functions to support the cable while the cable is being prepared. If the fiber installation tool is a fiber cleaving device, the protrusion 140, 142, 144, 146 may function to establish one of a plurality of support points necessary to properly cleave the optical fiber.

The fiber handler 10, 80 may be manufactured from any suitable material, such as a metal or a plastic. The fiber handler 10, 80 may be manufactured using any suitable manufacturing technique. Although fiber handler 10, 80 are depicted as generally cubic (i.e. square) or rectangular cross-sections with the geometries located on orthogonal faces, other variations of the fiber handler 10, 80 may be constructed in a cylindrical fashion with the fiber receiving geometries located on the cylinder's surface. Further, the fiber handler 10, 80 may be comprised of separate subcomponents, each having one or more specific fiber geometries, that are fastened together to form an assembly accommodating multiple fiber constructions. This allows customization of the assembled handler to a specific set of commonly occurring fiber constructions. Distinct fiber-specific geometries can be placed on the same face of the fiber handler 10, 80, and the entire fiber handler 10, 80 can be swapped end-for-end to align the appropriate geometry with the fiber installation tool.

FIGS. 3A and 3B illustrate a fiber handler 10' installed in a fiber installation tool, which is a fiber cleaving tool 200. The fiber cleaving tool 200 is formed with a "clam shell" design and in FIG. 3A, the fiber cleaving tool 200 is shown with an upper half 206 open to make visible the internal portions of the upper half 206 and the lower half 208. The fiber handler 10' is installed with a body 12' fitting snugly in a bay 203 of the fiber cleaving tool 200. Contact surfaces (not shown) of the fiber handler 10' contact surfaces of the bay 203 of the fiber cleaving tool 200. A fiber optic cable 201 comprising a jacket or coating 202 surrounding an optical fiber 204 is shown with the fiber optic cable 201 in position relative to the fiber handler 10' and fiber cleaving tool 200. As illustrated, a first cable receiving surface 18' is in its operable position with a channel 38' able to receive the fiber optic cable 201.

A protrusion 19' projects from the body 12' of the fiber handler 10' and engages with the fiber cleaving tool 200, when the fiber handler 10' is installed. The protrusion 19' has a contour or profile that at least partially interfaces with rounds, chamfers, or fillets 212 of the fiber cleaving tool 200. The protrusion 19' may partially support the optical fiber 204 for cleaving and may establish one of a plurality of support locations necessary to cleave the fiber 204 properly.

To cleave the optical fiber 204 of the fiber optic cable 201, the fiber optic cable 201 may be restrained in the fiber handler 10' by the fiber restraint such as a latch (See FIG. 1A) and/or a clamping feature 210 of the fiber cleaving tool 200. The clamping feature 210 rests on a cable support surface 50' and clamps the jacket 202 (i.e. may clamp a buffer or a coating) of the fiber optic cable 201 in place while the optical fiber 204 is cleaved by the scoring blade and anvil within the tool 200.

Generally, the fiber handler described herein is illustrated as comprising a plurality of faces, surfaces, and facets. The orientation, size, shape and location of many of theses surfaces are such that installation and the ability of the fiber handler to mate with a corresponding fiber installation tool are facilitated. Thus, the orientation, size, shape, and location of a particular face, surface, or facet may change to enhance and facilitate the ability of the fiber handler to engage a specific fiber installation tool.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A fiber handler for a fiber optic installation tool, the fiber handler comprising: a body having opposed first and second ends, with a first face and a second face that extend between opposed first and second ends of the body;
    the body being configured to be selectively mounted to an installation tool with its first face in an operable position or with its second face in an operable position with respect to the installation tool;
    the first face being configured with a first fiber specific geometry for receiving an optical fiber of a first construction;
    the second face being configured with a second fiber specific geometry for receiving an optical fiber of a second construction;
    wherein the first fiber specific geometry is different from the second fiber specific geometry; and
    wherein the first construction comprises a jacketed fiber cable and wherein the channel comprises a first portion sized to accept and hold the jacket and a second portion sized to accept and hold the fiber from which the jacket has been stripped.

2. The fiber handler of claim 1, further comprising a fiber restraint on the fiber handler and having a closed position covering at least one face for holding a fiber in place in proper alignment.

3. The fiber handler of claim 2, wherein the fiber restraint has an open position displaced from the at least one face to allow placement of a fiber on the face.

4. The fiber handler of claim 1, further comprising a transition between the first portion and the second portion configured to be engaged by an end of the jacket when the cable is inserted into the fiber handler to restrict forward movement of the cable within the channel.

5. The fiber handler of claim 1, further comprising at least one magnet included in the first face of the body.

6. The fiber handler of claim 1, further comprising a protrusion extending from an end of the body and adapted to mate with a feature of the fiber optic installation tool.

7. A fiber handler for a fiber optic installation tool, the fiber handler comprising: a body having opposed first and second ends, with a first face and a second face that extend between opposed first and second ends of the body;
    the body being configured to be selectively mounted to an installation tool with its first face in an operable position or with its second face in an operable position with respect to the installation tool;
    the first face being configured with a first fiber specific geometry for receiving an optical fiber of a first construction;
    the second face being configured with a second fiber specific geometry for receiving an optical fiber of a second construction;
    wherein the first fiber specific geometry is different from the second fiber specific geometry; and
    wherein the body comprises at least one additional face having an operable position configured to accept an optical fiber of a corresponding construction and to align the fiber to the installation tool when the face is in its operable position.

8. The fiber handler of claim 7, wherein the at least one additional face comprises a third face and a fourth face.

9. A fiber optic installation tool comprising:
    a mechanism for performing a predetermined operation on an optical fiber;
    a bay for receiving a fiber handler configured to accept an optical fiber and to align the optical fiber to the mechanism of the installation tool;
    a fiber handler removably mounted in the bay;
    the fiber handler having a body with opposed first and second ends, a first face configured with a first fiber specific geometry for receiving an optical fiber of a first construction extending between opposed first and second ends, and a second face configured with a second fiber specific geometry for receiving an optical fiber of a second construction extending between opposed first and second ends of the body;

the fiber handler being oriented in the bay to locate the first face in an operable position for accepting an optical fiber of the first construction and aligning the optical fiber with the mechanism;

the fiber handler being selectively re-mountable in the bay to position the second face in an operable position for accepting an optical fiber of the second construction and aligning the optical fiber with the mechanism; and wherein the first fiber specific geometry is different than the second fiber specific geometry.

10. The fiber optic installation tool of claim 9, wherein the fiber handler comprises additional faces each configured to accept an optical fiber of a corresponding construction, the fiber handler being selectively mountable in the bay to locate the additional faces in respective operable positions for accepting an optic fiber of the corresponding construction and aligning the optical fiber with the mechanism.

11. The fiber optic installation tool of claim 9, wherein the first and second constructions are selected from a group consisting essentially of coated fibers, furcated fibers, tight buffered fibers, and jacketed fiber cables.

12. The fiber optic installation tool of claim 9, wherein the configuration of the first and second faces comprises an elongated channel extending along the faces.

13. The fiber optic installation tool of claim 12, wherein the channel extending along the second face comprises a first portion sized to accept an optical fiber from which a jacket has been stripped and a second larger portion sized to accept the jacket.

14. The fiber optic installation tool of claim 13, further comprising a transition between the first portion and the second portion configured to be engaged by an end of the jacket to restrict forward movement of the jacket within the channel.

15. The fiber optic installation tool of claim 9, wherein the mechanism comprises an optical fiber cleaver or a fusion splicer.

16. The fiber optic installation tool of claim 9, wherein the body further comprises additional faces configured to receive and orient optical fibers of respective additional constructions.

* * * * *